2,778,771

STABILIZING OF VITAMIN B$_{12}$ SOLUTIONS

George Herman Michel, Dumont, N. J., and Kenneth Wilbur Knight, Suffern, N. Y., assignors to American Cyanamid Company, New York, N. Y., a corporation of Maine No Drawing. Application May 16, 1952,
Serial No. 288,297

4 Claims. (Cl. 167—81)

This invention relates to the stabilizing of aqueous solutions containing vitamin B$_{12}$ activity.

Shortly after the isolation of vitamin B$_{12}$ in crystalline form, it was found that other substances could also be isolated from natural materials which were chemically different but possessed the same biological activity. Vitamin B$_{12}$, as originally isolated, contained a cyano radical whereas the other substances which possessed the same biological activity possessed hydroxyl or other groups instead of the cyano radical. Various other compounds have been synthesized by replacement of the cyano group of vitamin B$_{12}$ to yield products which are also effective in the treatment of pernicious anemia, as is vitamin B$_{12}$. Certain fermentation processes, for example the process in which aureomycin is produced by *S. aureofaciens* produces a mixture of substances having vitamin B$_{12}$ activity including vitamin B$_{12}$ itself, and the hydroxy analog, the latter being in predominating quantities. These various substances have been called cobalamins with a prefix indicating the replaceable radical, for example, cyano-cobalamin representing what is generally called vitamin B$_{12}$, hydroxocobalamin designating what is now known as vitamin B$_{12b}$, and the prefixes sulfato, chloro, sulfido, and the like indicating other radicals which are contained in the molecule in place of the cyano radical of vitamin B$_{12}$.

Although these various substances are all considered to be substantially biological equivalents in the treatment of pernicious anemia, it has been found that some are unstable and decompose at sterilizing temperatures and on standing. This is particularly unfortunate when preparations are derived from natural materials in which substantial quantities of the unstable forms occur.

The instability of these preparations has been recognized and stabilizing agents have been proposed for use in stabilizing vitamin B$_{12}$ solutions, note U. S. Patents 2,566,123, 2,579,679 and 2,584,627 which describe the use of certain substances as stabilizing agents.

We have found unexpectedly that a very cheap and biologically inocuous substance, namely ammonium sulfate, can be effectively used to stabilize the vitamin B$_{12}$ activity of aqueous solutions containing unstable forms of cobalamins. The reason for the stabilizing action of the ammonium sulfate is not presently known and cannot be explained on the usual theories concerning stabilizing agents. We have also found that such substances as ammonium chloride and sodium sulfate have no stabilizing action. It is also certain that there is no replacement of the unstable radical by a more stable form as a result of the ammonium sulfate treatment.

The amount of ammonium sulfate needed to stabilize the aqueous solution obviously depends upon the amount of the unstable forms of vitamin B$_{12}$ present in the solution. In an aqueous solution in which the vitamin B$_{12}$ activity is substantially 75% hydroxo cobalamin and 25% cyano cobalamin, we find that one should use about 25 parts by weight of ammonium sulfate for each part by weight of the vitamin B$_{12}$ activity contained in the solution. Larger amounts of ammonium sulfate appear to be harmless. Inasmuch as the injectable solutions of vitamin B$_{12}$ contain from about 10 to 50 mcg. of vitmain B$_{12}$ activity per milliliter, the solution to be stabilized should contain from about 250 to 1250 mcg. of ammonium sulfate per ml. Amounts of ammonium sulfate up to physiological strength, about 1% by weight, may be used without disadvantage. Where the solution contains substantial amounts of the more stable forms of vitamin B$_{12}$, for example, cyano cobalamin, less of the ammonium sulfate may be necessary. Accordingly, the amount of ammonium sulfate may vary from about 100 mcg. to 10,000 mcg. per ml. of solution.

It is also possible to stabilize more concentrated solutions of vitamin B$_{12}$ which may be subject to deterioration during the purification process. In such event, one would use approximately the same ratios of ammonium sulfate as mentioned above.

In illustration of the invention, 15 ml. of an aqueous solution containing 48.5 mcg. per ml. of vitamin B$_{12}$, approximately 75% hydroxo cobalamin, and 25% cyano cobalamin was treated with 18.2 mg. of reagent grade ammonium sulfate. The pH of the solution was 4.8. This solution when autoclaved for one hour at 15 lbs. steam pressure showed no appreciable loss of vitamin B$_{12}$ activity. Without ammonium sulfate a 50% loss of activity occurred. Other experiments show that the solution is stable on storage whereas without ammonium sulfate substantial deterioration occurs over a period of several months.

We claim:

1. An aqueous solution containing 10 to 50 mcg. of vitamin B$_{12}$ per ml. and from 100 to 10,000 mcg. of ammonium sulfate.

2. A storage stable aqueous solution containing at least 10 micrograms of vitamin B$_{12}$ activity per milliliter, a substantial part of which is hydroxocobalamin and from about 100 micrograms to 10,000 micrograms per milliliter of ammonium sulfate as a stabilizing agent.

3. A therapeutically acceptable solution for parenteral administration containing 10–50 micrograms of hydroxocobalamin per milliliter and 100–10,000 micrograms per milliliter of ammonium sulfate as a stabilizing agent.

4. A method of stabilizing the vitamin B$_{12}$ activity of aqueous solutions containing at least 10 micrograms per milliliter of hydroxocobalamin which comprises the step of adding to an aqueous solution containing said amount of hydroxocobalamin an amount of ammonium sulfate ranging from 100 micrograms to 10,000 micrograms per milliliter.

References Cited in the file of this patent

UNITED STATES PATENTS

| | | |
|---|---|---|
| 2,530,416 | Wolf | Nov. 21, 1950 |
| 2,566,123 | De Rose | Aug. 28, 1951 |
| 2,576,932 | Garibaldi | Dec. 4, 1951 |
| 2,631,964 | Brunings | Mar. 17, 1953 |
| 2,677,644 | Lockhart | May 4, 1954 |

FOREIGN PATENTS

| | | |
|---|---|---|
| 499,383 | Belgium | Nov. 30, 1950 |

OTHER REFERENCES

Smith: Proceedings of the Biochemical Society, in the Biochemical Journal, October 1948, pages VIII, IX. (Copy in Scientific Library.)

Ellis: Journal of Pharmacy and Pharmacology (1949); pages 60 and 61 (167–81 B$_{12}$). (Copy in Scientific Library.)